United States Patent
Wach

(10) Patent No.: US 11,094,948 B2
(45) Date of Patent: Aug. 17, 2021

(54) SYSTEM, IN PARTICULAR FOR A MOTOR VEHICLE OR UTILITY VEHICLE, AND METHOD FOR THE SAME

(71) Applicant: Robert Bosch GmbH, Stuttgart (DE)

(72) Inventor: Achim Wach, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 15/126,124

(22) PCT Filed: Jan. 29, 2015

(86) PCT No.: PCT/EP2015/051828
§ 371 (c)(1),
(2) Date: Sep. 14, 2016

(87) PCT Pub. No.: WO2015/139870
PCT Pub. Date: Sep. 24, 2015

(65) Prior Publication Data
US 2017/0084938 A1     Mar. 23, 2017

(30) Foreign Application Priority Data
Mar. 17, 2014  (DE) .................... 10 2014 204 921.0

(51) Int. Cl.
*H01M 8/04082*   (2016.01)
*H01M 8/04089*   (2016.01)
(Continued)

(52) U.S. Cl.
CPC ......... *H01M 8/04201* (2013.01); *B60L 50/72* (2019.02); *B60L 58/31* (2019.02);
(Continued)

(58) Field of Classification Search
CPC ......... H01M 2250/20; H01M 8/04201; H01M 8/04753; H01M 8/04425; H01M 8/04097;
(Continued)

(56) References Cited

U.S. PATENT DOCUMENTS

| 9,577,272 B2 * | 2/2017 | O'Neill ............. H01M 8/04097 |
| 2005/0193989 A1 * | 9/2005 | Veenstra .......... B60K 15/03006 |
| | | 123/527 |

(Continued)

FOREIGN PATENT DOCUMENTS

| DE | 102005009823 | 9/2005 |
| DE | 102008019594 | 10/2009 |

(Continued)

OTHER PUBLICATIONS

International Search Report for Application No. PCT/EP2015/051828 dated Apr. 8, 2015 (English Translation, 3 pages).

*Primary Examiner* — Mayla Gonzalez Ramos
(74) *Attorney, Agent, or Firm* — Michael Best & Friedrich LLP

(57) ABSTRACT

The invention relates to a system (10) for storing natural gas as fuel, in particular for a motor vehicle or utility vehicle, wherein the system (10) has at least one storage tank (11) for the fuel. It is provided according to the invention that the storage tank (11) is assigned at least one fuel cell (12), wherein natural gas that has changed into the gaseous state can be fed from the storage tank (11) to the fuel cell (12) in order to be at least partially converted into electrical energy, wherein the storage tank (11) and the fuel cell (12) interact by way of a control unit (13). In this case, the fuel cell (12) is in the form of a solid oxide fuel cell.

7 Claims, 3 Drawing Sheets

(51) Int. Cl.

| | | |
|---|---|---|
| *H01M 8/0438* | (2016.01) | |
| *H01M 8/04746* | (2016.01) | |
| *B60L 58/31* | (2019.01) | |
| *B60L 50/72* | (2019.01) | |
| *H01M 8/04225* | (2016.01) | |
| *B60L 58/34* | (2019.01) | |
| *H01M 8/124* | (2016.01) | |

(52) U.S. Cl.
CPC ......... *B60L 58/34* (2019.02); *H01M 8/04097* (2013.01); *H01M 8/04225* (2016.02); *H01M 8/04425* (2013.01); *H01M 8/04753* (2013.01); *H01M 2008/1293* (2013.01); *H01M 2250/20* (2013.01); *Y02E 60/50* (2013.01); *Y02T 90/40* (2013.01)

(58) Field of Classification Search
CPC ......... H01M 8/04225; H01M 8/04082; H01M 8/04089; H01M 8/0438; H01M 8/04746; H01M 2008/1293; B60L 11/1883; B60L 11/1885; B60L 11/1894; B60L 58/31; B60L 58/34; B60L 50/72; Y02E 60/50; Y02T 90/40

See application file for complete search history.

(56) References Cited

U.S. PATENT DOCUMENTS

| | | | | |
|---|---|---|---|---|
| 2008/0092830 | A1* | 4/2008 | Suzuki | H01M 8/04022 123/3 |
| 2008/0118799 | A1* | 5/2008 | Matsumoto | H01M 8/04007 706/45 |
| 2010/0257873 | A1* | 10/2010 | Mueller | F17C 11/005 62/46.1 |
| 2010/0323256 | A1* | 12/2010 | Kaupert | H01M 8/04022 429/423 |
| 2011/0167799 | A1* | 7/2011 | Son | B01D 53/90 60/274 |
| 2012/0021313 | A1* | 1/2012 | Yasuda | H01M 8/04201 429/416 |
| 2013/0004879 | A1* | 1/2013 | Ohtani | H01M 8/2465 429/443 |

FOREIGN PATENT DOCUMENTS

| | | |
|---|---|---|
| DE | 102008043927 | 5/2010 |
| EP | 2131172 | 12/2009 |
| EP | 2357388 | 8/2011 |
| WO | 03010844 | 2/2003 |

\* cited by examiner

SYSTEM, IN PARTICULAR FOR A MOTOR VEHICLE OR UTILITY VEHICLE, AND METHOD FOR THE SAME

BACKGROUND OF THE INVENTION

The invention relates to a system for storing natural gas as fuel, in particular for a motor vehicle or utility vehicle, wherein the system has at least one storage tank for the fuel, and relates further to a method for operating such a system.

Such a system typically relates to liquid gas tank accommodated in a motor vehicle or utility vehicle, wherein the natural gas stored therein is in a liquid state, typically at a temperature of −162° C. The down side to this prior art technology is that the liquid natural gas already begins to evaporate after a few days of standing time and thus the natural gas that has transitioned into the vapor phase has to be released in a controlled manner via a valve to the surrounding environment when a certain vapor pressure has been exceeded. As a result, a negative impact on the environment can occur because the methane ($CH_4$) present as the main component in the natural gas is more harmful to the environment than, for example, carbon dioxide ($CO_2$) by approximately a factor of 25. In addition, the natural gas already released to the environment can no longer be used as an energy source for supplying an internal combustion engine of a motor vehicle, said engine being connected to the liquid gas tank.

SUMMARY OF THE INVENTION

The system of the invention has the advantage that natural gas vaporized from the liquid phase can be fed from the storage tank or respectively the liquid gas tank to a fuel cell that interacts with the latter. In accordance with the degree of efficiency thereof, the fuel cell can convert the chemical energy of the natural gas supplied to the same from the liquid gas tank directly into electric energy. Said electric energy is then directly available to a load in the motor vehicle or utility vehicle. In the event that the corresponding vehicle sits idle for a longer period of time, the fuel cell of the system can advantageously convert the natural gas, which has vaporized to a certain degree in the liquid gas tank, into electric energy for operating electrical auxiliary units in the vehicle or for charging the vehicle battery.

By the fuel cell of the system being advantageously designed as a solid oxide fuel cell, hydrocarbons as main components of natural gas can be supplied directly to the solid oxide fuel cell for the purpose of energy conversion. As a result, a relatively high degree of efficiency for the energy conversion occurs.

According to an expedient embodiment of the invention, the fuel cell can, in terms of fluid mechanics, be operatively connected to the storage tank via at least one flow path. In so doing, the natural gas which has passed from the liquid to the gaseous state in the storage tank can flow off via this flow path to a gas inlet of the fuel cell. Pressure is reduced in the interior of the tank to a corresponding degree.

By at least one valve being disposed in the at least one flow path, a defined and controlled releasing or blocking of this flow path is possible by actuating the corresponding valve.

Provision is made in an especially advantageous embodiment of the invention for a control unit to be provided for controlling the at least one valve and the fuel cell. To this end, the control unit can bring the at least one valve into an open or closed switching state in order to release or block the corresponding flow path for the fuel and, in the open switching state of the valve, to activate the fuel cell for the inflowing natural gas in order to set the energy conversion process within the fuel cell into motion.

A practically autonomously operating system can be achieved by at least one pressure sensor being disposed for the continuous detection of a pressure produced by the natural gas in the storage tank, wherein the control unit acquires pressure measured values detected by the pressure sensor and signaled to the control unit; and additionally the control unit controls the at least one fuel cell and the at least one valve as a function of the pressure in the storage tank. A preferred embodiment of the invention therefore consists of the control unit only then releasing the flow path to the fuel cell and activating the fuel cell if the acquired pressure in the storage tank achieves or exceeds a predetermined threshold value. Particularly in the shutdown phase of a motor vehicle or a utility vehicle, if the corresponding internal combustion engine is turned off or respectively inactive, pressure in the storage tank gradually builds up due to the natural gas changing from the liquid to the gaseous state. At the point in time, where this pressure is equally large as or larger than the predetermined or respectively preset pressure threshold value, the flow path leading to the fuel cell is released by means of the control unit, wherein the gaseous natural gas flowing to the fuel cell can be converted there into electrical energy by the fuel cell that is activated by means of the control unit. The electrical energy is then available for use by an electric load in the motor or utility vehicle. A gradual reduction in the vapor pressure in the storage tank is achieved by means of the natural gas which flows to the fuel cell and which is then processed by said fuel cell in electrochemical processes. By a flow path being provided for a combustion chamber in order to supply the combustion chamber with natural gas from the storage tank at least in the driving mode of the internal combustion engine and by the flow path leading to the fuel cell being used to supply natural gas from the storage tank to the fuel cell, wherein the flow path leading to the fuel cell can only then be released if the acquired pressure in the storage tank achieves or exceeds a predetermined pressure threshold value, the system according to the invention provides various flow paths for the energy recovery of the natural gas.

Provision is made in an advantageous modification to the invention for natural gas or respectively residual gas excessively escaping from the fuel cell to be returned to the storage tank via at least one flow path and thus to further be available as an energy source for the system. A first flow path, which is used to supply natural gas from the storage tank, and a second flow path, which is used to return natural gas or respectively residual gas that has excessively escaped the fuel cell, are connected to the fuel cell.

The method according to the invention is especially used to operate the system and comprises a procedural step, which is to be cyclically executed, of acquiring a temporally dependent pressure that in each case is currently prevailing in the storage tank as well as an event-dependent procedural step of supplying natural gas that is present in the vapor state from the storage tank to the fuel cell and of activating the fuel cell, wherein said event-dependent procedural step of supplying natural gas and activating the fuel cell particularly only then takes place if the acquired pressure in the storage tank achieves or exceeds a predetermined threshold value.

An advantageous modification to the method according to the invention can consist of returning natural gas, which moved in excess to a cathode side of the fuel cell in the activated state of the fuel cell, to the storage tank. As a result, natural gas that has reached the gas outlet side of the fuel cell and consequently is not used in the energy conversion process within the fuel cell can again be stored in the storage tank. This initially excess natural gas thus does not reach the atmosphere but is again available to the system as an energy source on account of being returned to the storage tank.

BRIEF DESCRIPTION OF THE DRAWINGS

Exemplary embodiments of the invention are explained and illustrated in detail in the following description and in the attached drawings. In schematic views.

DETAILED DESCRIPTION

Figure 1:
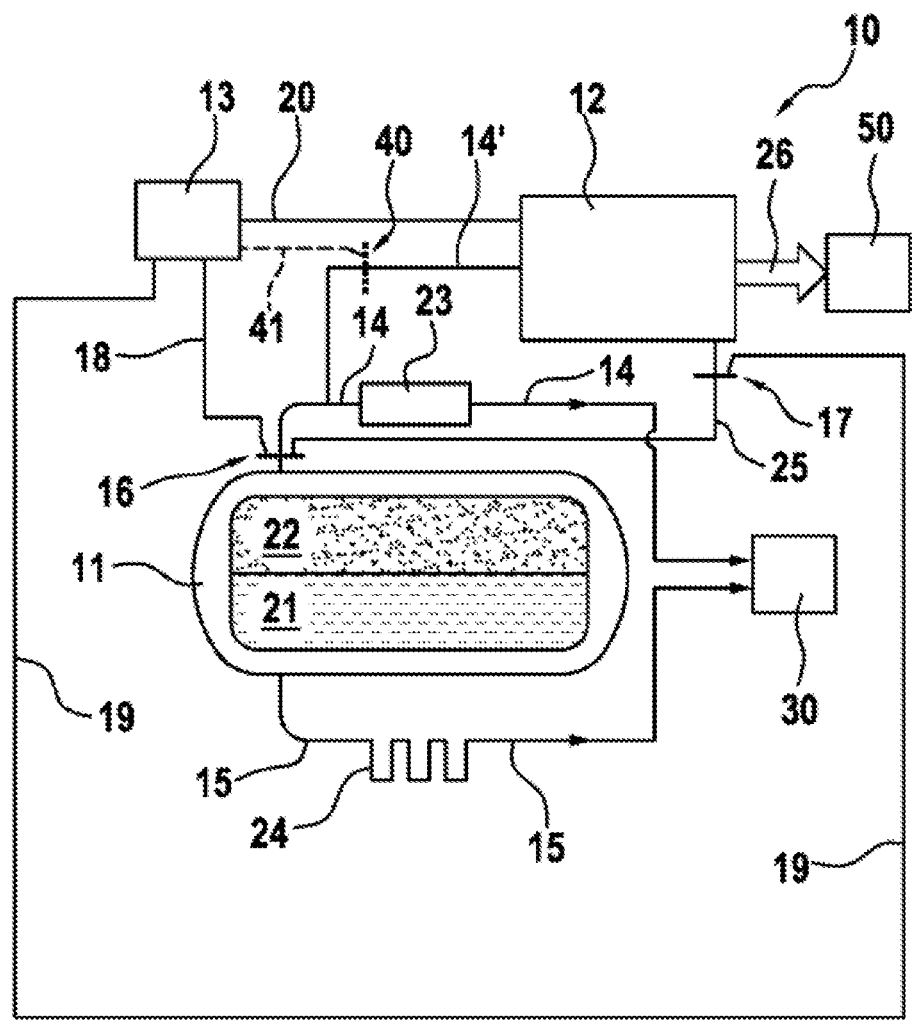
FIG. 1 shows a system according to the invention in a schematically depicted arrangement, wherein the system comprises a storage tank and a solid oxide fuel cell as well as a control unit that is used for the interaction of storage tank and solid oxide fuel cell.

FIG. 1 shows a main circuit diagram of the inventive system 10 pursuant to a preferred embodiment. The system 10 is designed as part of a motor or utility vehicle that can be operated with natural gas as fuel and comprises a storage tank 11 for receiving and storing natural gas, which is kept in the storage tank that is designed as a liquid gas tank, substantially in the liquefied state at low temperatures typically around −162° C., and a solid oxide fuel cell or respectively SOFC fuel cell 12 (SOFC: "solid oxide fuel cell") as well as a control unit 13. In this case, the control unit 13 facilitates the interaction of the liquid gas tank 11 and the solid oxide fuel cell 12.

Such a solid oxide fuel cell 12 relates to a high-temperature fuel cell, which—as is known to the person skilled in the art—is operated at an operating temperature ≥500° C. and requires fuel supplied for the operation on the cathode side and atmospheric oxygen supplied on the anode side in order to produce electric energy on the basis of the resulting electrochemical processes, which electric energy can be tapped at an electrical output of the solid oxide fuel cell. As is further known to the person skilled in the art, the internal charge transport takes place by means of oxygen ions, which diffuse through an electrolyte of the solid oxide fuel cell to the anode in order to be able to oxidize the fuel there while giving off water and electrons, said electrons being available at the electrical output of the solid oxide fuel cell. The solid oxide fuel cell can directly process natural gas as fuel due to the high operating temperature.

In the liquid gas tank 11, the gas content that changes from the liquid phase 21 of the natural gas into the gas phase 22 accumulates in the upper region of the liquid gas tank 11. During the running operation of the internal combustion engine 30 of the corresponding motor vehicle, i.e. during the driving operation, natural gas in the gaseous state enters the internal combustion engine 30 via a delivery line 14 leading out from the liquid gas tank and a downstream compressor 23 and is combusted there in a combustion chamber of the internal combustion engine 30 in order to drive the motor vehicle, whereas a second delivery line leading out from the bottom of the liquid gas tank 11 carries liquefied natural gas to an evaporator 24, where the liquefied natural gas is transferred into the vapor state and flows out from the evaporator 24 to the internal combustion engine 30. In order, in terms of energy technology, to also now use the portion of the tank contents which has passed into the gas phase 22 during a shutdown phase of the internal combustion engine, a feed line 14', which leads to the anode side of the fuel cell 12, branches off from the first delivery line 14; thus enabling the gas inlet side of the solid oxide fuel cell 12 to be connected to the liquid gas tank 11 via this feed line 14' as the flow path and natural gas supplied on the anode side to be converted into electric energy if a first valve 16, which is disposed in the first delivery line 14 upstream of the feed line 14', i.e. upstream of the compressor, is switched into the open position and thereby releases the first delivery line 14 and consequently the feed line 14' to the anode side of the fuel cell 12. In order that natural gas not used by the solid fuel cell 12 for energy conversion, which is then present in excess on the cathode side of the solid oxide, can be returned to the liquid gas tank 11, the solid oxide fuel cell 12 is connected on the cathode side to a return line 25 to the liquid gas tank 11 by means of the gas outlet thereof (not depicted) for gas accumulating in excess, said return line extending as the second flow path between the cathode side of the solid oxide fuel cell 12 and the first valve 16. In this case, a second valve 17, which is disposed in the return line 25 in the proximity of the solid oxide fuel cell 12, is provided to open or block the return line 25 depending on the switching position. If the second valve 17 is located in the open position, natural gas escaping in excess at the cathode outlet can initially flow up to the first valve and can then move back into the liquid gas tank 11 when the first valve 16 is open during the activated state of the solid oxide fuel cell 12. In order to be able to switch the delivery line 14 comprising the feed line 14' that branches off to the solid oxide fuel cell 12 as well as the return line 25 selectively, i.e. independently of one another, the valve 16 is designed as a multiway valve in the exemplary embodiment. As an alternative thereto, the return line 25 can also be directly, i.e. without interposing the valve 16, introduced into the liquid gas tank 11. The control unit 13 is provided to actuate the two valves 16, 17, said control unit being in electrical operative connection with the first valve 16 via a first signal line 18 and with the second valve 17 via a second signal line 19. A third signal line 20 of the control unit 13 is connected to the solid oxide fuel cell 12 in order to activate or respectively deactivate the latter. That means that, during activation, the SOFC fuel cell 12 is heated up in a manner known to the person skilled in the art to an operating temperature which lies at T≥500° C. by switching on a heating element that is not depicted; whereas such a heating element is deactivated by being switched off. According to one preferred exemplary embodiment, a pressure sensor, which is not depicted, is disposed in the upper region of the interior of the liquid gas tank 11 in order to continually acquire the vapor pressure prevailing there, which is transmitted via a—non-depicted—measuring signal line to the control unit 13. A valve 40, depicted by a dotted line in FIG. 1, can optionally be provided in the feed line 14'. As a result, in the driving mode, i.e. when the internal combustion engine 30 is running, the feed line 14' leading to the solid oxide fuel cell 12 can be separately or respectively selectively blocked or opened by means of the optional valve 40 if the first valve 16 is switched into the open position so that natural gas from the storage tank 11 can flow via the delivery line 14 and the compressor 23 into the combustion chamber of the internal combustion engine 30. In order to actuate the optional valve 40, the control unit 13 is operatively connected electrically to the valve 40 via an electric signal line 41 that is depicted as a dashed line in FIG. 1. During a driving operation, i.e. when the internal combustion engine is running, the feed line 14' to the solid oxide fuel cell 12 can thus be blocked by the control unit 13 bringing the optional valve 40 into the blocking position via the electric signal line 41 if the delivery line 14 to the internal combustion engine 30 is opened by means of the control unit 13 and the valve 16. When the vehicle is shut down, i.e. when the internal combustion engine is turned off, the control unit 13 can switch the valve 16 as well as the optional valve 40 into the respective open position in order to open the delivery line 14 and the feed line 14', which branches off therefrom upstream of the compressor 23 to the solid oxide fuel cell 12, for the natural gas flowing from the liquid gas tank 11.

For reasons of clarity, the delivery line 14 leading to the internal combustion engine 30 and the feed line 14' leading to the solid oxide fuel cell 12 are introduced into the liquid gas tank 11 via a common valve 16 in the exemplary embodiment. In practice, a valve that is separate in each case can however be provided for each of the two lines in the coupling region of the liquid gas tank 11, said valves being controllable by means of the control unit 13.

Figure 2:
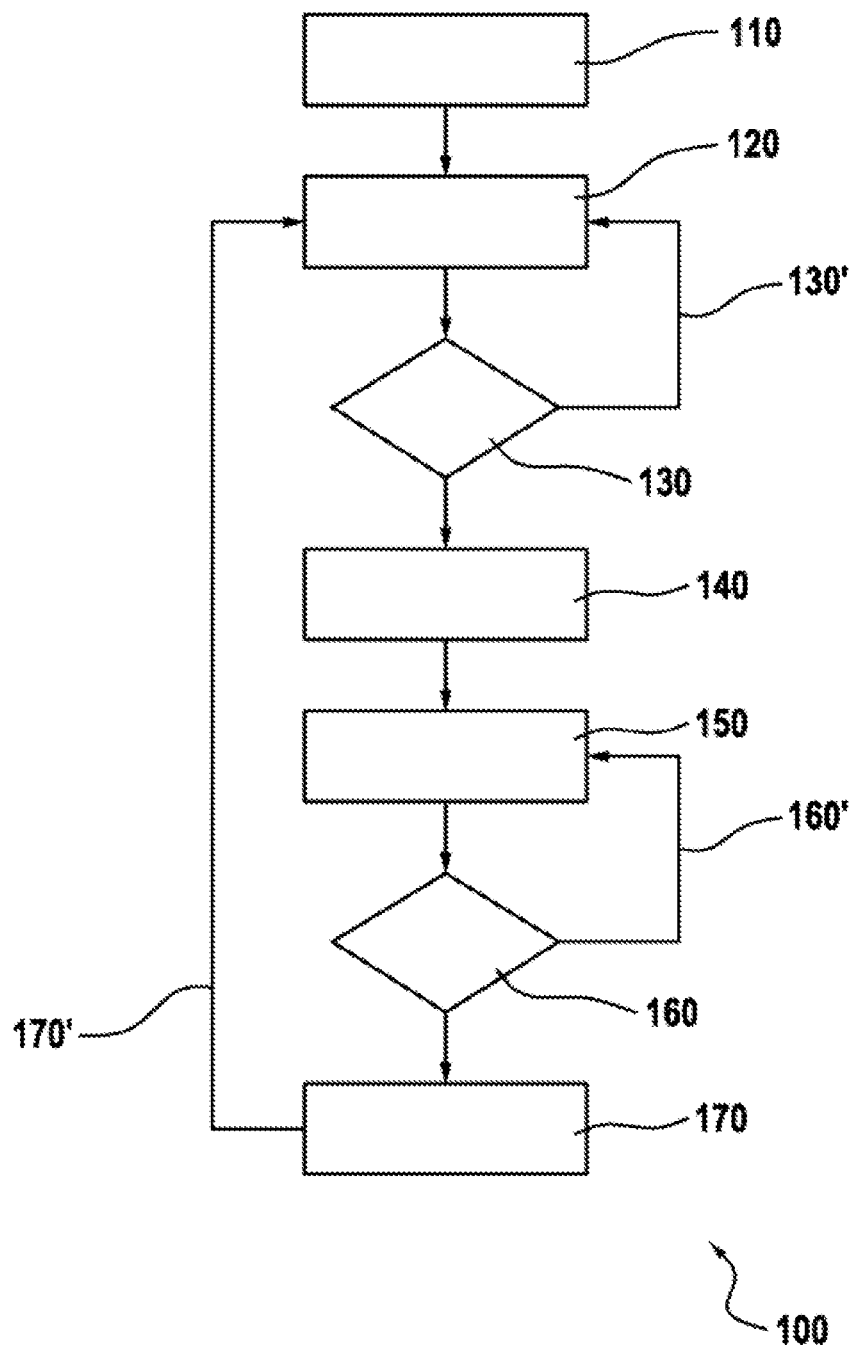
FIG. 2 shows a flow diagram comprising the essential steps of the method implemented in the control unit according to a first embodiment of the inventive method for operating the system.

FIG. 2 shows a flow diagram which is denoted in its entirety by the reference number 100 and comprises the essential procedural steps of the control method according to the invention, which is used to operate the system 10, i.e. is used to facilitate the interaction between the solid oxide fuel cell 12 and the liquid gas tank 11, and is implemented in the control unit 13. In a first step 110 of the method, the control unit is initially initialized. In a step 120 of the method immediately following step 110, a pressure sensor (not depicted) disposed in the liquid gas tank 11 acquires the pressure or vapor pressure currently prevailing in each case of the portion of the tank contents situated in the gas phase, wherein this pressure value p(t) (pressure as a function of the respective time t) moves across a measurement signal line, which is not depicted, to the control unit 13 and is processed there. In an immediately following step 130 of the method, a comparison of the pressure value p(t) acquired currently at a point in time t with a predetermined pressure threshold value $p_s$ is carried out. If the comparison in step 130 results in the currently acquired pressure value p(t) at the point in time t achieving or exceeding the pressure threshold value $p_s$, i.e. the condition $p(t) \geq p_s$ is met, the control unit 13 goes on to the next step 140. In the other case, i.e. if $p(t) < p_s$ is valid, the method jumps back 130' to step 120, wherein the currently prevailing pressure p(t'), where t'=t+Δt, i.e at a point in time t', is measured again after a predetermined relatively short time interval t+Δt (time increment) and is transmitted to the control unit 13. The pressure threshold value $p_s$ is set such that the size thereof is smaller than that burst pressure which is specified for the embodiment of the liquid gas tank 11 being used. In order to ensure a reliable operation of the liquid gas tank 11, the pressure threshold value $p_s$ is preferably set to a value which lies approximately 10% below the specified burst pressure. In step 140, the first valve 16 is opened in the case of a positively fulfilled condition $p(t) \geq p_s$ and the solid oxide fuel cell 12 is activated by the control unit 13 correspondingly actuating the first valve 16 via the first signal line 18 and practically simultaneously activating the solid oxide fuel cell 12 via the third signal line 20. Hence, gas moves out of the liquid gas tank 11 initially via the first delivery line 14 and then via the feed line 14' to the anode side of the solid oxide fuel cell 12 when the valve 16 is open. If the optional valve 40 has also been implemented in the arrangement of FIG. 1, both valves 16 and 40 are actuated together in step 140 by the control unit 13 via the signal lines 18 and 41 in order to release the delivery line 14 and the feed line 14' to the solid oxide fuel cell 12. In addition, the second valve 17 is also opened in order to open the return line 25 connected on the cathode side for natural gas that has flowed in excess. In a step 150 subsequent thereto, the pressure p(t) is again acquired as a function of the time t and it is determined in a comparison 160 immediately following the acquisition of the pressure p(t) whether said pressure value p(t) lies below the pressure threshold value $p_s$ by checking whether the condition $p(t) < p_s$ exists. If this condition is met, the first valve 16—and, if implemented, also the optional valve 40—is then closed to the solid oxide fuel cell 12 in step 170, the solid oxide fuel cell 12 is deactivated and furthermore the second valve 17 is closed, whereby a return 170' to step 120 occurs where the currently prevailing pressure is again acquired or respectively measured so that the steps 120 to 170 are passed through practically in an endless loop.

The excess pressure building in the tank 11 is consequently reduced by opening the valve 16—as well as the optional valve 40—and by the release of the feed line 14' to the solid oxide fuel cell 12 resulting thereby, while the natural gas evaporated out of the liquid state can flow to the anode side of the solid oxide fuel cell 12.

Figure 3:
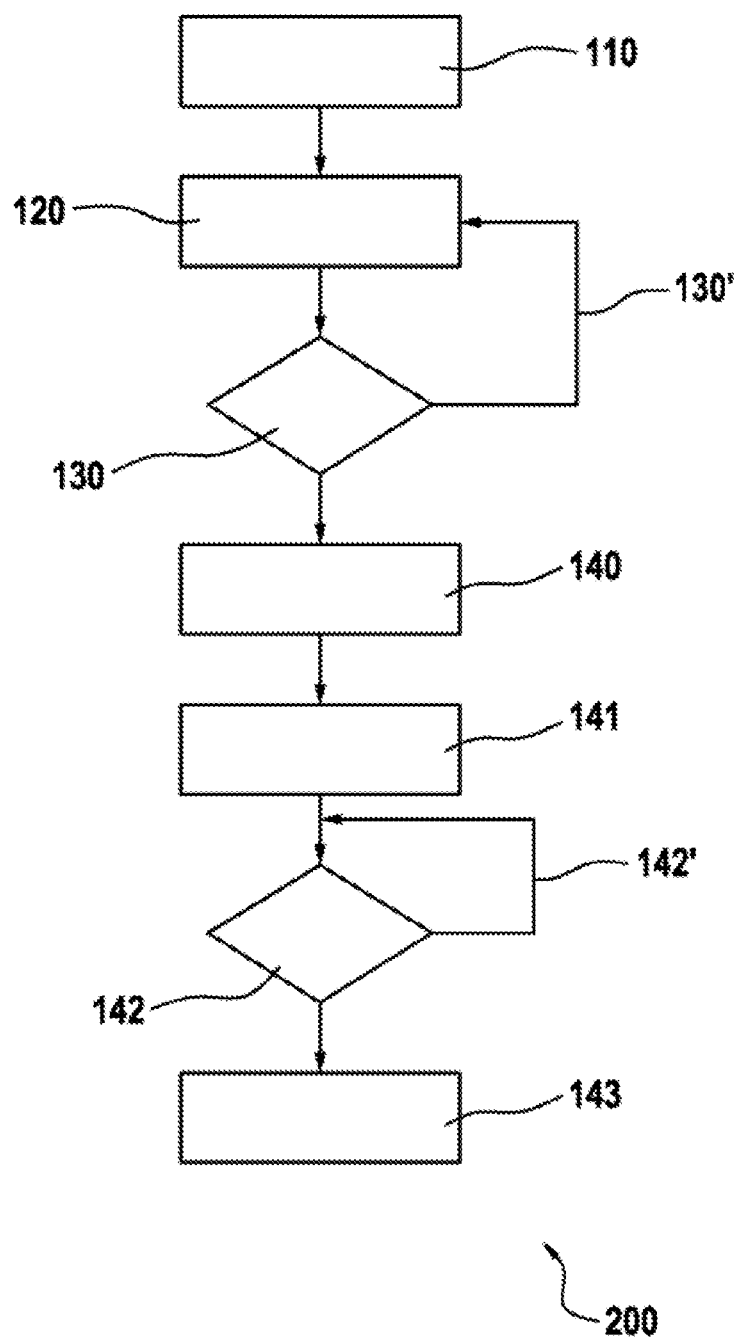
FIG. 3 shows a flow diagram comprising the steps of the method implemented in the control unit according to a second embodiment of the inventive method.

FIG. 3 show a flow diagram according to a second embodiment of the method according to the invention. Identical reference signs thereby denote identical procedural steps as in the first embodiment of FIG. 2. The second embodiment according to FIG. 3 is different from the embodiment depicted in FIG. 2 in that, instead of the steps 150 to 170 of the method depicted in FIG. 2, the steps 141 to 143 of the method are carried out in accordance with the flow diagram 200 of FIG. 3, which steps immediately follow the step 140 of the method, which is defined by opening the valve 16—as well as the optional valve 40—and activating the solid oxide fuel cell 12 as well as opening the second valve 17 by means of releasing the return line 25. In the following step 141, a time element is initialized, which starts a time counter, which determines the activation period of the solid oxide fuel cell 12, with a predetermined period of time, wherein the period of time can, for example, lie in the range of hours or even days. After the time element has been initialized, a query is made in step 142 whether the set period of time has elapsed. If this condition has not yet been met, a return 142' to the input of the step 142, where a new query is made, takes place after a predetermined time interval. If the condition is however met, i.e. the query in step 142 yields that the set period of time has been achieved, a transition to step 143 then occurs in which the time counter is stopped, the valves 16, 17 and 40 are closed, the solid oxide fuel cell 12 is deactivated and thus the method is concluded. In this modified embodiment of the method according to the invention, it is advantageous that the solid oxide fuel cell 12 remains activated for a period of time determined in advance, whereby a constant change between activation and deactivation phases of the solid oxide fuel cell 12 that last only a short time, e.g. when pressure fluctuations occur in the liquid gas tank 11, can be prevented.

In summary, provision is made in the system according to the invention for the liquid gas tank 11 to be assigned at least one solid oxide fuel cell 12, wherein fuel or respectively natural gas can then be supplied from the liquid gas tank 11 to the solid oxide fuel cell 12 such that said solid oxide fuel cell 12 converts the fuel supplied thereto at least partially into electrical energy for an electric load 50 in the motor vehicle or utility vehicle, said electric load 50 being connected via an electric connection 26 to the electric output of the solid oxide fuel cell 12. Auxiliary units of the motor vehicle or utility vehicle can be provided as electric loads, such as, for example, the on-board air conditioning system or cab heater. During the shutdown phase of the motor vehicle or utility vehicle, in which the internal combustion engine 30 is typically turned off or inactive, the electric load can be the battery; thus enabling the electric energy produced by the solid oxide fuel cell to be used for charging the vehicle battery. In contrast, the natural gas stored in the liquid gas tank 11 is used primarily for the fuel supply of the internal combustion engine 30 during the driving operation of the motor vehicle or utility vehicle. If the feed line 14' to the solid oxide fuel cell is additionally released and the latter is activated, the electric energy that is converted in this process can be used for operating auxiliary units in the onboard electrical system of the motor vehicle or utility vehicle as well as for charging the vehicle battery.

Besides the first and second delivery line, which are used to supply fuel to the internal combustion engine 30, the system 10 additionally comprises the first flow path, which comprises a section of the first delivery line 14 and the feed line 14' and leads to the solid oxide fuel cell 12, and the second flow path as a return line 25 for the natural gas that flows out of the solid oxide fuel cell 12.

The control unit 13 of the system 10 comprises, in the simplest embodiment thereof, a microcomputer, e.g. a microcontroller, comprising a memory in which the procedural steps of the method according to the invention are stored as an executable control program, wherein the microcomputer controls the sequence of the method according to the invention and to this end carries out consecutively the individual steps of the method. For this purpose, the microcomputer of the control unit 13 processes via peripheral interfaces the vapor pressure in the interior of the tank, which is detected in each case currently from the pressure sensor as a function of time, and controls the corresponding valves as well as the solid oxide fuel cell 12 as a function of said detected vapor pressure.

The method according to the invention can be especially easily implemented in both method variants if the vapor pressure of the natural gas in the liquid gas tank 11 is acquired in consistently uniform time intervals.

The invention claimed is:

1. A system for storing natural gas as fuel, the system comprising an internal combustion engine (30), at least one storage tank for the fuel, and at least one fuel cell (12), wherein the system is configured such that natural gas that has changed into a gaseous state can be fed from the storage tank (11) to the fuel cell (12) in order to be at least partially converted into electrical energy, wherein the system also comprises at least one flow path (14, 14', 25) configured to operatively connect the fuel cell (12) in terms of fluid mechanics to the storage tank (11), and at least one return flow path (25) configured to return natural gas escaping in excess from the fuel cell (12) to the storage tank (11), the system further including at least one valve (16, 17) disposed in the at least one flow path (14, 14', 25), a control unit (13) for controlling the at least one valve (16, 17) and the fuel cell (12), and at least one pressure sensor assigned to the storage tank (11) to continually detect a pressure produced in the storage tank (11) by the natural gas,
wherein the control unit (13) acquires pressure measurement values that are detected by the pressure sensor and signaled to the control unit (13), and
wherein, when the internal combustion engine (30) of the system is turned off, the control unit (13) controls the at least one fuel cell (12) and the at least one valve (16, 17) as a function of the pressure in the storage tank (11) such that the control unit (13) only opens the flow path (14, 14') to the fuel cell (12) and activates the fuel cell (12) when the pressure in the storage tank (11) achieves or exceeds a predetermined pressure threshold value that is a function of a burst pressure of the storage tank, thereby relieving over-pressure in the storage tank (11).

2. The system according to claim 1, wherein the control unit (13) is electrically operatively connected to the at least one valve via a signal line.

3. The system according to claim 2, wherein a further signal line of the control unit (13) is connected to the fuel cell (12).

4. The system according to claim 1, characterized in that a second flow path (14) is provided for a combustion chamber of an internal combustion engine (30) in order to supply the combustion chamber with natural gas from the storage tank (11) at least during a driving mode of the internal combustion engine.

5. The system according to claim 1, characterized in that the fuel cell (12) is in the form of a solid oxide fuel cell.

6. A method for operating the system according to claim 1, the method comprising the following steps:
acquiring (120) a temporally dependent pressure that is in each case currently prevailing in the storage tank (11), and
supplying (140) natural gas present in the vapor state from the storage tank (11) to the fuel cell (12) and activating the fuel cell (12) only when the acquired pressure in the storage tank (11) reaches or exceeds the predetermined pressure threshold value that is a function of the burst pressure of the storage tank, thereby relieving over-pressure in the storage tank (11),
wherein, in an activated state of the fuel cell, natural gas that has moved in excess to a cathode side of the fuel cell (12) is returned to the storage tank (11).

7. A motor vehicle comprising a system according to claim 1.

* * * * *